(12) United States Patent
Witt et al.

(10) Patent No.: US 8,463,882 B2
(45) Date of Patent: Jun. 11, 2013

(54) SERVER CLONING IN A COMPUTING-ON-DEMAND SYSTEM

(75) Inventors: Emily Katherine Witt, Carver, MN (US); Robert F. Novak, Catonsville, MD (US); Patrick M. Joanny, Silver Spring, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 396 days.

(21) Appl. No.: 12/911,377

(22) Filed: Oct. 25, 2010

(65) Prior Publication Data

US 2012/0102163 A1    Apr. 26, 2012

(51) Int. Cl.
*G06F 15/177* (2006.01)
(52) U.S. Cl.
USPC .......................................................... 709/220

(58) Field of Classification Search
USPC .................. 709/203, 208, 217, 220, 227, 245
See application file for complete search history.

(56) References Cited

U.S. PATENT DOCUMENTS

| | | | |
|---|---|---|---|
| 7,299,468 B2 * | 11/2007 | Casey et al. .................... | 718/104 |
| 7,500,236 B2 * | 3/2009 | Janzen .......................... | 717/174 |
| 7,784,053 B2 * | 8/2010 | Casey et al. .................... | 718/104 |
| 8,010,634 B2 * | 8/2011 | Bealkowski ................... | 709/220 |
| 2002/0161839 A1 * | 10/2002 | Colasurdo et al. ............. | 709/204 |
| 2003/0069946 A1 * | 4/2003 | Nair et al. ...................... | 709/220 |
| 2012/0102135 A1 * | 4/2012 | Srinivasan et al. ............. | 709/213 |
| 2012/0102163 A1 * | 4/2012 | Witt et al. ...................... | 709/221 |

\* cited by examiner

*Primary Examiner* — Michael Won

(57) ABSTRACT

A system may convert a server into a reference server, create a clone of the reference server in a selected network, place the clone in a user network, and notify a user that the clone server is ready for use.

20 Claims, 10 Drawing Sheets

SERVER CLONING IN A COMPUTING-ON-DEMAND SYSTEM

BACKGROUND INFORMATION

An in-house system developer may sometimes purchase and stage devices to build a system. When purchasing the devices, the system developer may evaluate device specifications, price, and/or equipment compatibility in light of particular project requirements. When staging the devices, the system developer may install operating systems, applications, databases and web servers, may apply patches, and/or may configure the devices.

DETAILED DESCRIPTION OF PREFERRED EMBODIMENTS

The following detailed description refers to the accompanying drawings. The same reference numbers in different drawings may identify the same or similar elements.

As described below, a system may provision both virtual resources and physical resources. When a user wishes to obtain computing resources (e.g., a network, a server, an application, a web server, etc.), the user may connect to an integrated provisioning system via a web portal. Once connected via a web interface, the user may input parameters that describe the desired resources. Based on the parameters, the integrated resource provisioning system may provision and allocate virtual and/or physical resources with or without manual intervention from a system administrator or an operator.

In some cases, a user may wish to obtain computing resources that include more than one identical or similar virtual/physical server. For these cases, the system allows the user to clone virtual/physical servers. By cloning multiple physical/virtual devices, the user may avoid having to individually create and configure each of the virtual/physical servers, which can be a time consuming process.

Figure 1:
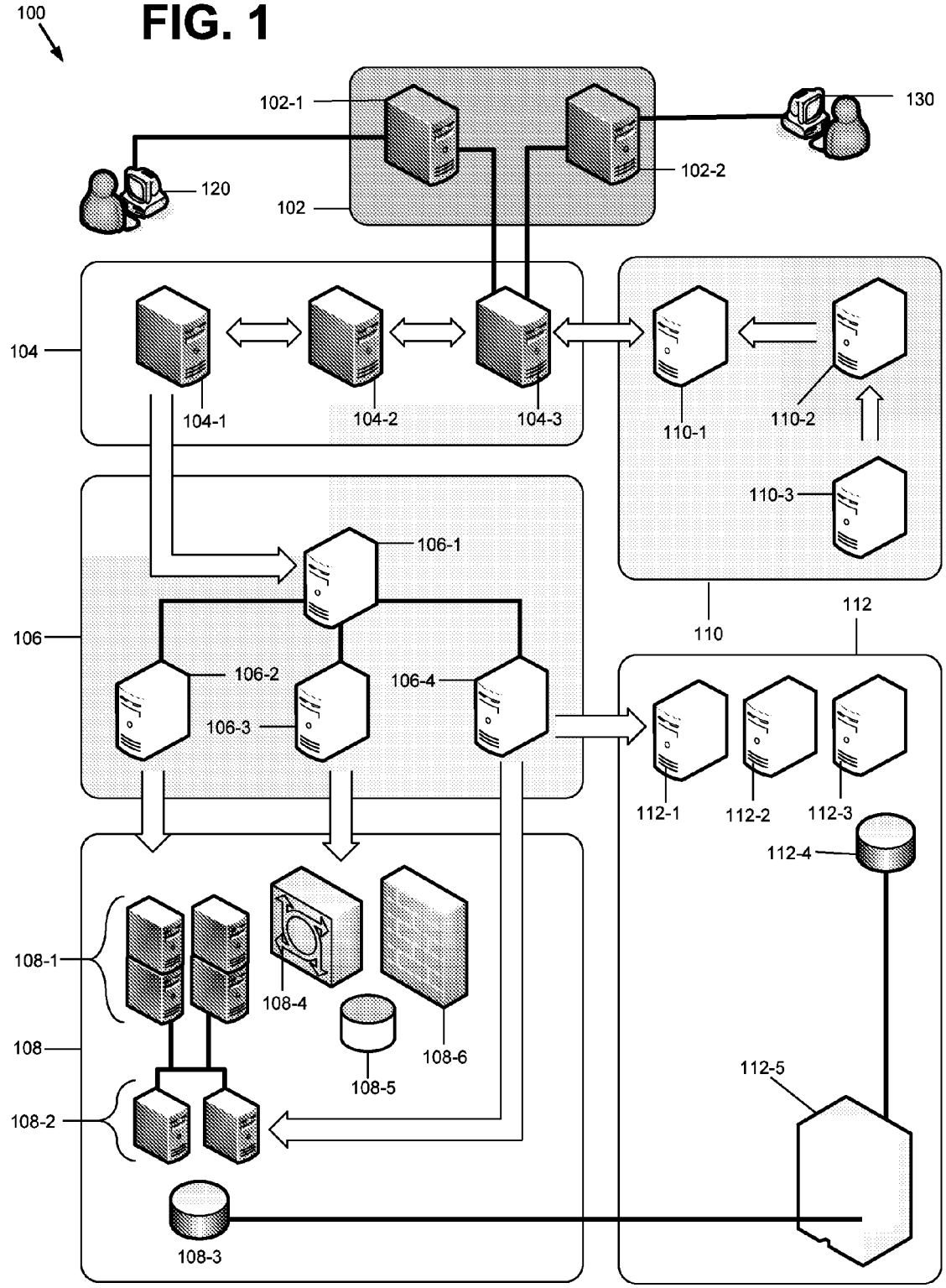
FIG. 1 is a diagram illustrating an exemplary network in which concepts described herein may be implemented.

FIG. 1 is a diagram illustrating an exemplary network in which concepts described herein may be implemented. In one implementation, network 100 may include one or more wired and/or wireless networks that are capable of exchanging information, such as voice, video, data, multimedia information, text, etc. For example, network 100 may include one or more public switched telephone networks (PSTNs) or another type of switched network. Network 100 may also include one or more wireless networks and may include a number of transmission towers for receiving wireless signals and relaying the received signals toward the intended destination. Network 100 may further include one or more packet switched networks, such as an Internet Protocol (IP) based network, a local area network (LAN), a wide area network (WAN), a personal area network (PAN), an intranet, the Internet, or another type of network that is capable of exchanging information.

As shown, network 100 may include a presentation network 102, resource management network 104, workflow network 106, virtual system network 108, inventory management network 110, and physical resource network 112. For simplicity, network 100 of FIG. 1 does not show other network or network components, such as bridges, routers, switches, wireless devices, etc. Depending on the implementation, network 100 may include additional, fewer, or different networks and/or network components.

Presentation network 102 may include devices that interact with users and system administrators. As further shown in FIG. 1, presentation network 102 may include an administrator portal device 102-1 and a user portal device 102-2. Administrator portal device 102-1 may interact with and relay information between a system administrator device, shown as item 120, and resource management network 104. Through the interaction, system administrator device 120 may perform system/network administration tasks (e.g., managing user accounts, performing an action that a user is not authorized to perform, etc.).

User portal device 102-2 may interact with and relay information between a user device, illustrated as item 130, and resource management network 104. User device 130 may access provisioning services that are available via user portal device 102-2. For example, user device 130 may request resource management network 104 to clone a set of virtual machines based on a reference server.

Resource management network 104 may provide provisioning services. In providing the provisioning services, resource management network 104 may track pools of resources that are available to user device 130, reserve s portion of the resources based on a request from user device 130, and allocate the reserved resources to user device 130. In addition, resource management network 104 may deallocate the resources (e.g., return the portion to the pool) when user device 130 indicates that the user does not need the resources. In addition, resource management network 104 may provide support for administrative tasks (e.g., administer users perform resource allocation tasks that a user is not authorized to perform, etc.).

As further shown in FIG. 1, resource management network 104 may include a job database device 104-1, resource manager database 104-2, and resource management device 104-3. Job database device 104-1 may receive a job description (e.g., a list of tasks) from resource management device 104-3 and store it in an active job queue until the job is performed. Resource manager database 104-2 may store and/or retrieve configuration/usage data pertaining to a particular user and/or other bookkeeping information.

Resource management device 104-3 may provision/de-provision resources based on inventory information provided by inventory management network 110. To provision/de-provision the resources, resource management device 104-3 may create a description of a job based on: user input relayed by user portal device 102-2; user configuration; and/or available resources. Resource management device 104-3 may handoff the job description to job database device 104-1, to be placed in the active job queue. In some implementations, resource management device 104-3 may create a reference server (e.g., a server that may be copied or cloned), freeze the server (e.g., prevent the server from changing parameters or state), unfreeze the server, clone the server, and/or update the server.

Workflow network 106 may perform jobs whose descriptions are in the active job queue at job database device 104-1. Once the job is performed, workflow network 106 may instruct job database device 104-1 to dequeue the job description (e.g., creating a reference server). As further shown in FIG. 1, workflow network 106 may include a workflow engine device 106-1, virtual machine management (VMM) control device 106-2, network management device 106-3, and resource lifecycle management device 106-4.

Workflow engine device 106-1 may perform subtasks of a job as defined by a job description in the active job queue at job database device 104-1. In one implementation, workflow engine device 106-1 may poll the active job queue to detect the job description. Workflow engine device 106-1 may request job database device 104-1 to remove the job description from the queue when the subtasks are completed.

In driving/performing each of the subtasks of a job, workflow engine device 106-1 may employ VMM control device 106-2, network management device 106-3, and/or resource lifecycle management device 106-4. Each of the subtasks in the job description may entail allocation, deallocation, controlling, and/or monitoring of virtual resources, physical resources, and/or network resources. For example, assume that user device 130 requests resource management device 104-3 to allocate a virtual machine. In response, resource management device 104-3 may create a job description that includes subtasks for creating a virtual machine, and place the job description at job database device 104-1. When workflow engine device 106-1 is about to perform the subtasks associated with creating the virtual machine, work flow engine device 106-1 may dispatch one or more requests for performing virtual machine-related functions to VMM control device 106-2 (e.g., a request to create the virtual machine, clone a virtual machine, etc.). Possible requests that work flow engine device 106-1 may dispatch are further described below with reference to FIG. 5.

VMM control device 106-2, upon receiving requests from work flow engine device 106-1, may control and/or monitor one or more virtual machines by interacting with hypervisors. The term "hypervisor," as used herein, may refer to a program that monitors, creates, runs, removes, and/or controls a virtual machine (e.g., controls a lifecycle of a virtual machine) on a physical device. For example, when VMM control device 106-2 receives a request to create a virtual machine from work flow engine device 106-1, VMM control device 106-2 may issue a command to a hypervisor. The hypervisor may create the virtual machine on the host device.

Network management device 106-3 may perform network configuration functions on behalf of work flow engine device 106-1. The functions may include configuring network infrastructure components. FIG. 1 shows a number of different types of network objects that network management device 106-3 may manage, such as, for example, a virtual load balancer 108-4, virtual LAN 108-5, and virtual firewall 108-6. Virtual load balancer 108-4, virtual LAN 108-5, and virtual firewall 108-6 are further described below.

Resource lifecycle management device 106-4 may perform subtasks for provisioning a physical hardware device for the user. For example, resource lifecycle management device 106-4 may install an operating system on a server, install an application, etc. As shown in FIG. 1, resource lifecycle management device 106-4 may act on physical server devices 112-1 through 112-3 as well as virtual machines 108-2, as described below. For cloning, resource lifecycle management device 106-4 may be provided with parameters, which are obtained from a reference device and with which a server device may be configured.

Virtual system network 108 may include devices and/or components for hosting and implementing virtual machine-related and network component-related resources that may be provisioned for the user. As shown, these resources may include a hypervisor cluster 108-1, virtual machines 108-2, logical volume 108-3, virtual load balancer 108-4, virtual LAN 108-5, and virtual firewall 108-6.

Hypervisor cluster 108-1 may include a logical group of hypervisors and a hypervisor manager (not shown). When hypervisor cluster 108-1 receives a command or a request from VMM control device 106-2 (e.g., create a virtual machine), the hypervisor manager may issue a command/request to a hypervisor. The hypervisor may then create the virtual machine on a host device on which the hypervisor is installed. Depending on the implementation, the hypervisor may be hosted on a hardware device without an operating system, or alternatively, may be hosted as a software component running on top of an operating system.

Virtual machines 108-2 may include a software emulation of a computer system (e.g., a server, a personal computer, etc.). Each virtual machine 108-2 may be instantiated, removed, and managed by a hypervisor. Once created, user device 130 may utilize virtual machine 108-2 as if it were a physical device.

Logical volume 108-3 may include storage on a network (e.g., network attached storage (NAS), a disk on storage area network (SAN), etc.). Local volume 108-3 may be allocated as a resource by work flow engine 106-1. Once allocated, logical volume 108-1 may be mounted on a mount point on a virtual machine and used as storage (e.g., a file system, swap space, etc.). Virtual load balancer 108-4 may include an emulation of load balancer, and may be instantiated or removed upon demand from user device 130. The user may configure virtual load balancer 108-4 such that network traffic is distributed over the virtual and/or physical resources in accordance with specified thresholds (e.g., 40% of network traffic to one of virtual machines 108-2 and 60% of network traffic the other virtual machine). Virtual LAN 108-5 may be created upon demand from user device 130. User device 130 may configure and place selected virtual and physical resources on specific virtual LAN 108-5. Virtual firewall 108-6 may include an emulation of a physical firewall, and may be instantiated or deleted upon demand from user device 130. Once provisioned, virtual firewall 108-6 may be attached to virtual LAN 108-5 to protect the virtual and/or physical resources against undesired network traffic.

Inventory management network 110 may track inventory of network resources and provide inventory information to resource management network 104. As further shown in FIG. 1, inventory management network 110 may include IP address management device 110-1, data warehouse device 110-2, and an inventory management device 110-3.

IP address management device 110-1 may provision an IP address from a pool of IP addresses. In one implementaiton, in provisioning an IP address, IP address management device 110-1 may take into account network address translation schemes to identify which VLAN the IP address belongs to, such that an IP address conflict does not arise within the VLAN. When IP address management device 110-1 de-provisions an IP address, IP address management device 110-1 may return the IP address to a pool of IP addresses.

Data warehouse device 110-2 may include a database of inventory of resources that are available for provisioning, resources that have been provisioned for the user, and configuration management information. When a resource is added to a pool, is provisioned, or is de-provisioned, data warehouse device 110-2 may update/record the information (e.g., inventory information) about the resource in the database. In addition, data warehouse device 110-2 may write and insert data associated with configuration (e.g., a version of an operating system that is installed on a provisioned physical server, an IP address, etc.) into the database when the resource configuration changes.

Inventory management device 110-3 may obtain inventory and configuration related information by monitoring physical devices, and pass the information to data warehouse device 110-2.

Physical resource network 112 may include physical resources. These physical resources may be provisioned/de-provisioned upon a request from resource lifecycle management device 106-4. When physical resources in physical resource network 112 are provisioned/de-provisioned, resource lifecycle management device 106-4 or inventory management device 110-3 may update data warehouse device 110-2 with information about the provisioning and configuration information.

As further shown in FIG. 1, physical resource network 112 may include physical resources 112-1 through 112-3 (individually referred to as physical resource 112 and collectively as physical resources 112), logical volume 112-4, and storage device 112-5. Physical resource 112 may include a physical device or a component that may be provisioned via resource lifecycle management device 106-4. Logical volume 112-4 may include similar component as logical volume 108-3, and may operate similarly. Unlike logical volume 108-3 that is mounted on a virtual machine, however, logical volume 112-3 may be mounted on physical resource 112. Storage device 112-5 may include storage from which logical volumes (e.g., logical volume 108-3 or 112-4) may be allocated. Examples of storage device 112-5 may include a SAN disk and NAS devices.

In FIG. 1, although each of networks 102 through 112 are shown as including a number of devices, in an actual implementation, networks 102 though 112 may include additional, fewer, or different components than those shown in FIG. 1. In addition, depending on the implementation, functionalities of each of devices within networks 102-112 may be aggregated over fewer devices or distributed over additional devices. For example, in one implementation, functionalities of devices 112-1 through 112-3 in resource management network 112 may be provided by a single server device.

Figure 2:
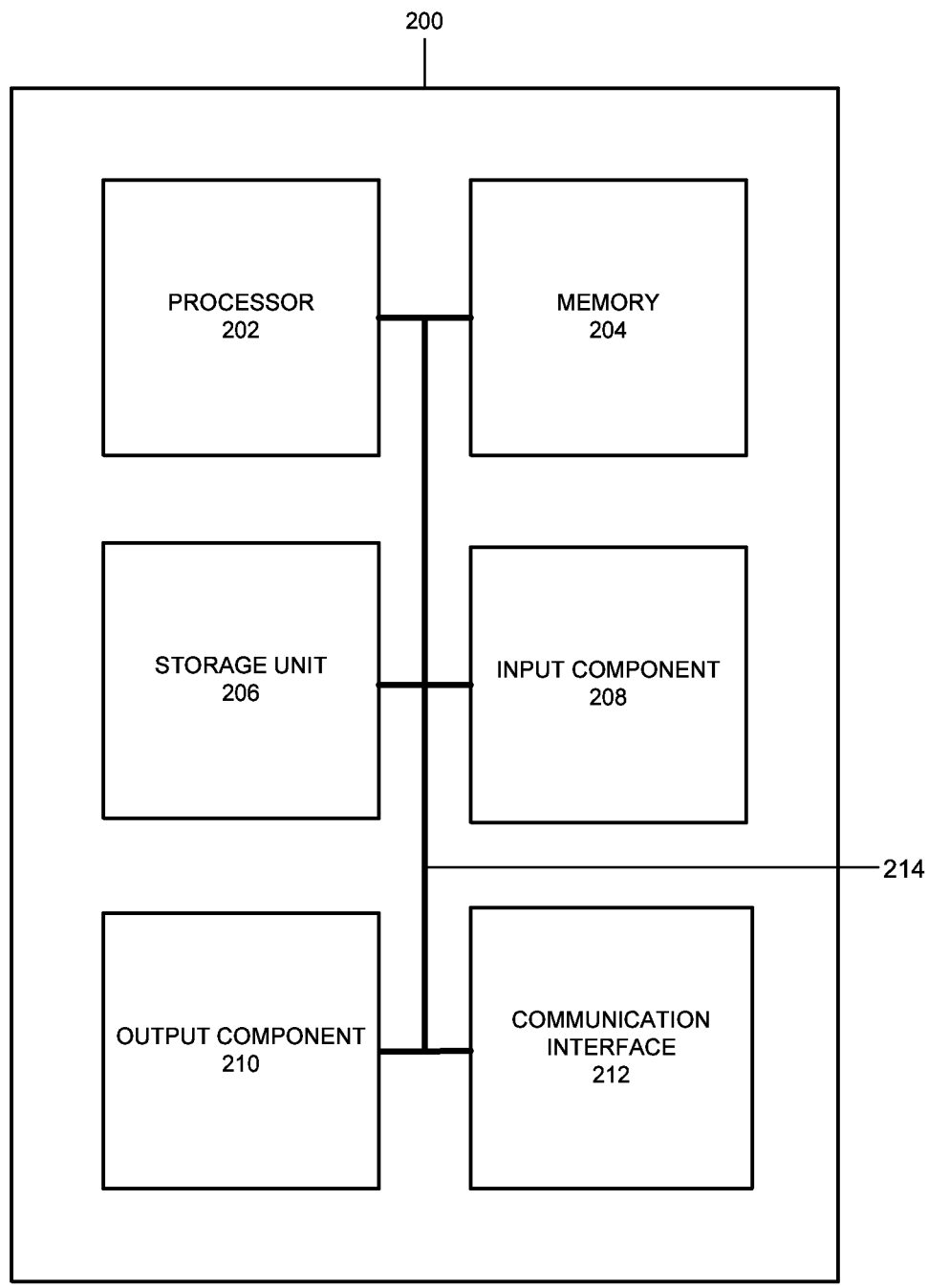
FIG. 2 is a block diagram of an exemplary network device shown in FIG. 1.

FIG. 2 is a block diagram of an exemplary network device 200. Network device 200 may be used to implement each of the devices in networks 102 through 112. In addition, network device 200 may also be used to implement components of a device that hosts one or more hypervisors. As shown in FIG. 2, network device 200 may include a processor 202, memory 204, storage unit 206, input component 208, output component 210, communication interface 212, and bus 214.

Processor 202 may include one or more processors, microprocessors, application specific integrated circuits (ASICs), field programmable gate arrays (FPGAs), or other processing logic that may interpret and execute instructions. Memory 204 may include static memory, such as read only memory (ROM), and/or dynamic memory, such as random access memory (RAM) or onboard cache, for storing data and machine-readable instructions. Storage unit 206 may include a magnetic and/or optical storage/recording medium. In some embodiments, storage unit 206 may be mounted under a directory tree or may be mapped to a drive. In some implementations, storage unit 206 may be part of another network device (e.g., storage device 112-5).

Input component 208 may permit a user to input information to network device 200. Input component 208 may include, for example, a keyboard, a keypad, a mouse, a pen, a microphone, a touch screen, voice recognition and/or biometric mechanisms, etc. Output component 210 may include a mechanism that outputs information to the user. Output component 210 may include, for example, a display, a printer, a speaker, etc. In some implementations, because network device 200 may operate as a server device, network device 200 may include a minimal number of input components 208 and output components 210 (e.g., a keyboard and/or a console), to minimize cost and to increase robustness.

Communication interface 212 may enable network device 200 to communicate with other devices and/or systems via a network, and may include one or more network interface cards (e.g., an Ethernet interface) for communicating with other devices. In other implementations, communication interface 212 may also include radio frequency (RF) transmitters, receivers and/or transceivers and one or more antennas for transmitting and receiving RF data. Bus 214 may provide an interface through which components of network device 200 can communicate with one another.

In FIG. 2, network device 200 is illustrated as including components 202-212 for simplicity and ease of understanding. In an actual implementation, network device 200 may include additional, fewer, or different components. For example, assuming that network device 200 is a virtual machine, components 202-212 may include virtual components. In another example, network device 200 may include one or more power supplies, fans, motherboards, video cards, etc.

Figure 3:
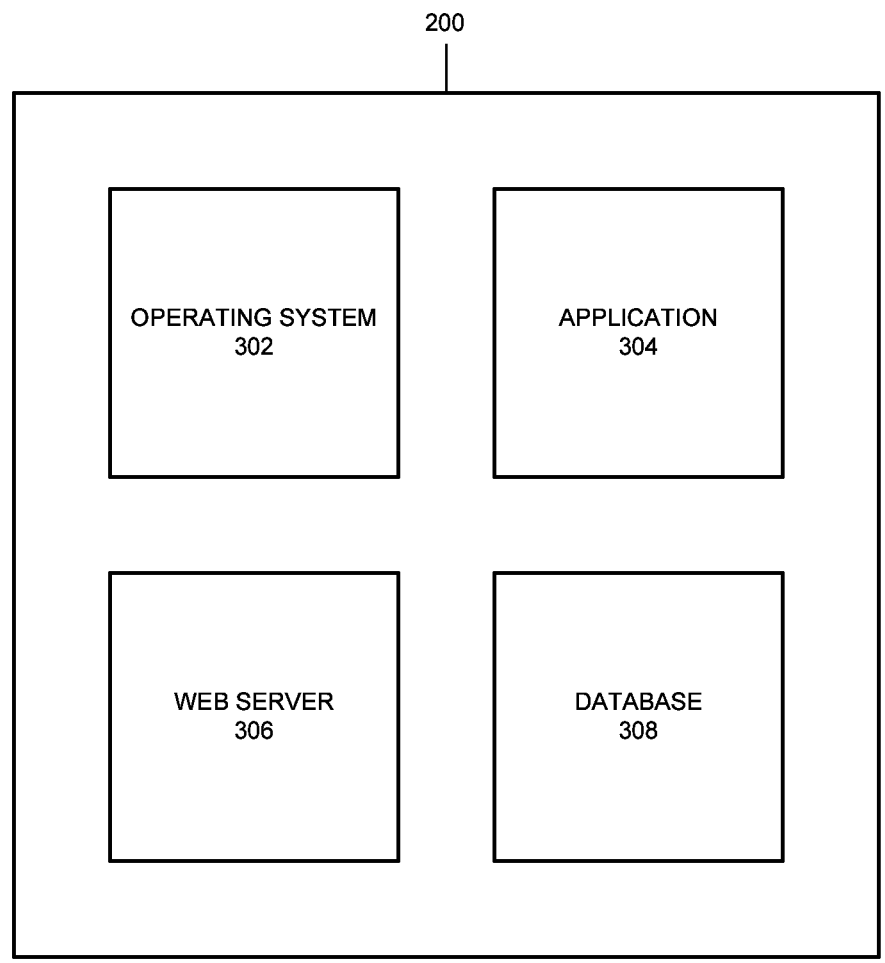
FIG. 3 is a block diagram illustrating exemplary functional components of the network devices shown in FIG. 1.

FIG. 3 is a block diagram illustrating exemplary functional components of network device 200. As shown, network device 200 may include an operating system 302, application 304, web server 306, and database 308. Depending on the implementation, network device 200 may include additional, fewer, or different components than those illustrated in FIG. 3.

Operating system 302 may manage hardware and software resources of network device 200. Operating system 302 may manage, for example, its file system, device drivers, communication resources (e.g., transmission control protocol (TCP)/IP stack), event notifications, etc.

Application 304 may include software program and/or scripts for rendering services. For example, in resource management device 104-3, application 304 may take the form of one or more programs for provisioning resources. Other examples of application 304 include a file transfer protocol (FTP) server, an email server, a telnet server, servlets, Java™ virtual machine (JVM), web containers, C# programs, firewall, components to support Authorization, Authentication and Accounting (AAA), and other applications that either interact with client applications or operate in stand-alone mode. In addition, application 304 may include a specialized server program, application server, web page, etc.

Web server 306 may include a software application for exchanging web page related information with one or more browsers and/or client applications. Database 308 may include records and files and may act as an information repository for network device 200. For example, in resource manager database 104-2, database 308 may store and retrieve configuration/usage data pertaining to a particular user. In another example, database 308 in job database device 104-1 may implement persistent queues for storing job descriptions. In such implementations, the queue may be robust and, therefore, recoverable upon device failure.

Figure 4:
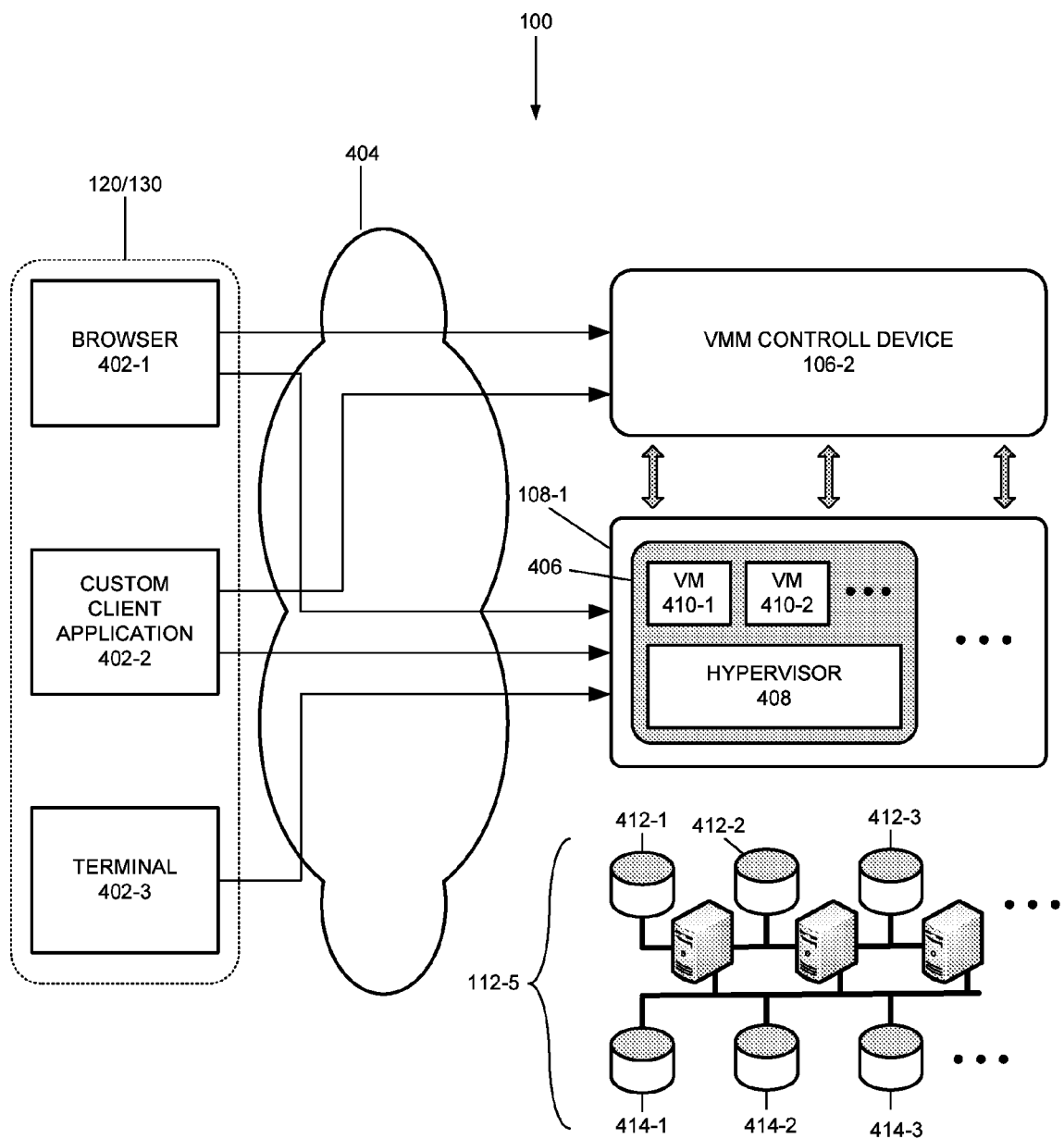
FIG. 4 illustrates interaction between a user device, VMM control device, hypervisor cluster, and storage device of FIG. 1 for provisioning and/or managing resources.

FIG. 4 illustrates interaction between administrator/user device 120/130, VMM control device 106-2, hypervisor cluster 108-1, and storage device 112-5 for provisioning and/or managing resources. The provisioning may include cloning virtual or physical servers. As shown in FIG. 4, administrator/user device 120/130 may interact with VMM control device 106-2 and virtual cluster 108-1 over network 404. Network 404 may be part of network 100, and may include network or network devices, such as user portal device 102-2, resource management device 104-3, etc.

As further shown in FIG. 4, administrator/user device 120/130 may host different types of client applications, such as a browser 402-1, custom client application 402-2, and/or terminal 402-3 (e.g., xterm). Browser 402-1 may include a web browser (e.g., Internet Explorer, Firefox, Safari, etc.). Custom client application 402-2 may include a software component specifically designed for interacting with VMM control device 106-2 and/or hypervisor cluster 108-1. Terminal 402-3 may include a command line interface based client terminal for remotely accessing different services, such as telnet services, SFTP services, etc.

As further shown in FIG. 4, VMM control device 106-2 may interact with hypervisor cluster 108-1. Hypervisor cluster 108-1 may include a hypervisor manager (not shown) and one or more hypervisor devices 406. In hypervisor cluster 108-1, the hypervisor manager may administer/control hypervisor devices 406.

Each hypervisor device 406 may include a hypervisor 408 and virtual machines 410-1 and 410-2. Although FIG. 4 shows two virtual machines 410-1 and 410-2, in an actual implementation, hypervisor device 406 may include fewer or additional virtual machines that are instantiated and monitored by hypervisor 408 upon user demand.

For storage, each hypervisor device 408 may access logical volumes. As shown in FIG. 4, the logical volumes may be implemented via storage device 112-5. In one implementation, storage device 112-5 may include SAN disks 412-1, 412-2, 412-3, etc., and NAS devices 414-1, 414-2, 414-3, etc.

In FIG. 4, user device 130 may control, monitor, provision, or de-provision a virtual machine to via browser 402-1. Through different devices (e.g., user portal device 102-2), a user's request for a service may reach VMM control device 106-2. VMM control device 106-2 may then carry out the user's request by performing a set of functions.

Figure 5:
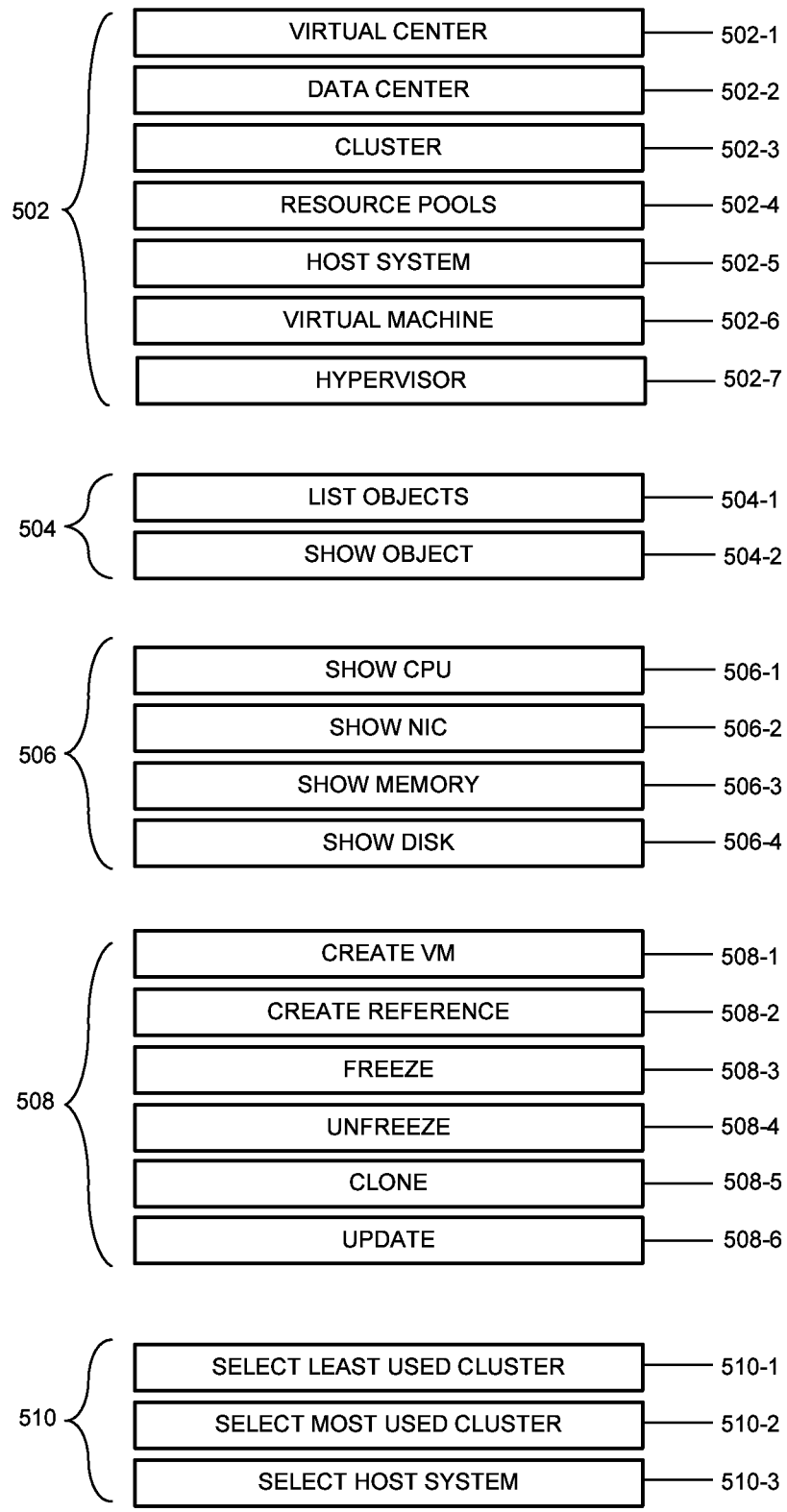
FIG. 5 is a list of exemplary functions that the VMM control device of FIG. 1 may support for provisioning and/or managing resources.

FIG. 5 is a list of exemplary functions that VMM control device 106-2 may support for provisioning and/or managing resources. As shown, VMM control device 106-2 may be requested to perform, by another device (e.g., workflow engine device 106-1), functions 504-1 through 510-3 on objects 502-1 through 502-7 (e.g., a software component) that are related to virtual machines. Depending on the implementation, VMM control device 106-2 may provide support for other functions and/or other types of objects.

Objects for which VMM control device 106-2 may provide support include virtual center 502-1, data center 502-2, cluster 502-3, resource pools 502-4, host system 502-5, virtual machine 502-6, and hypervisor 502-7. Virtual center 502-1 may include a collection of hypervisors 408 that are controlled or monitored by a hypervisor manager. Data center 502-2 may include a logical grouping of hypervisors and/or clusters of hypervisors. Cluster 502-3 may include a logical grouping of hypervisors. Resource pool 502-4 may include a group of hypervisor devices that aggregate CPU and/or memory capacity to be allocated to virtual machines on demand. Host system 502-5 may include a device for hosting a hypervisor. Virtual machine 502-6 may include a software emulation of a computer system. Hypervisor 502-7 may include a program that monitors, creates, runs, removes, and/or controls a virtual machine.

Functions 504 may include list objects function 504-1 and show object function 504-2. List objects function may request VMM control device 106-2 to provide a list of objects 502. For example, user device 130 may request VMM control device 106-2 to list virtual center 502-1. When VMM control device 106-2 receives the request, VMM control device 106-2 may provide a list of names of virtual centers within network 100. Show object function 504-2 may request VMM control device 106-2 to provide details that are related to object 502. For example, user device 130 may request VMM control device 106-2 to show a particular virtual center 502-1. In response to the request, VMM control device 106-2 may provide a version number of the hypervisor manager.

Show functions 506 may include show CPU 506-1, show NIC 506-2, show memory 506-3, and show disk 506-4. Show functions 506-1 through 506-4 may show a CPU usage, network usage, memory usage, and disk usage of a cluster, respectively.

Server allocation functions 508 may include create VM 508-1, create reference 508-2, freeze 508-3, unfreeze 508-4, clone 508-5, and update 508-6. Create VM 508-1 may create a new virtual machine within a data center 502-2. In requesting create VM, a device may also specify parameters for the virtual machine, such as the amount of memory for the virtual machine, number of CPUs to be used for the virtual machine, the name of the virtual machine, etc.

Create reference 508-2 may create a reference virtual server or convert a physical server into a reference physical server. As used herein, the term "reference virtual server" may refer to a virtual server prototype, which may be virtual or physical and which may be copied to create other, similarly configured virtual servers. As used herein, the term "reference physical server" may refer to a prototype physical server that may be used as a basis upon which other physical server devices may be similarly configured. Freeze 508-3 may shutdown a virtual or physical server and may prepare or "prime" the virtual/physical server for duplication. Unfreeze 508-4 may resume the operation of a frozen virtual/physical server.

Clone 508-5 may create a copy of a frozen, reference virtual server, or alternatively, may configure a physical server similarly as a frozen, reference physical server. Update 508-6 may update a reference virtual/physical server. Create reference 508-2, freeze 508-3, clone 508-5, and update 508-6 are described in greater detail below with references to FIGS. 7 through 10.

Select functions 510 may identify a specific object 502 among a group of objects 502. As shown, select functions 510 may include select least used cluster 510-1, select most used cluster 510-2, and select host system 510-3. Select least used cluster 510-1 and select most used cluster 510-2 may identify a cluster that is least used and a cluster that is most used within a portion of network 100. Select host system 510-3 may select an unused physical device in network 100 for hosting a hypervisor.

In the above, the functions that are listed in FIG. 5 may be used to manage, control, provision and/or de-provision virtual machines in virtual or physical components/devices in network 108. Other network devices and/or networks 102-112 may use different functions to manage, control, provision and/or de-provision the same or other types of resources (e.g., machine access control (MAC) addresses, IP addresses, logical volume, etc.) and/or to control workflow processes.

Figure 6:
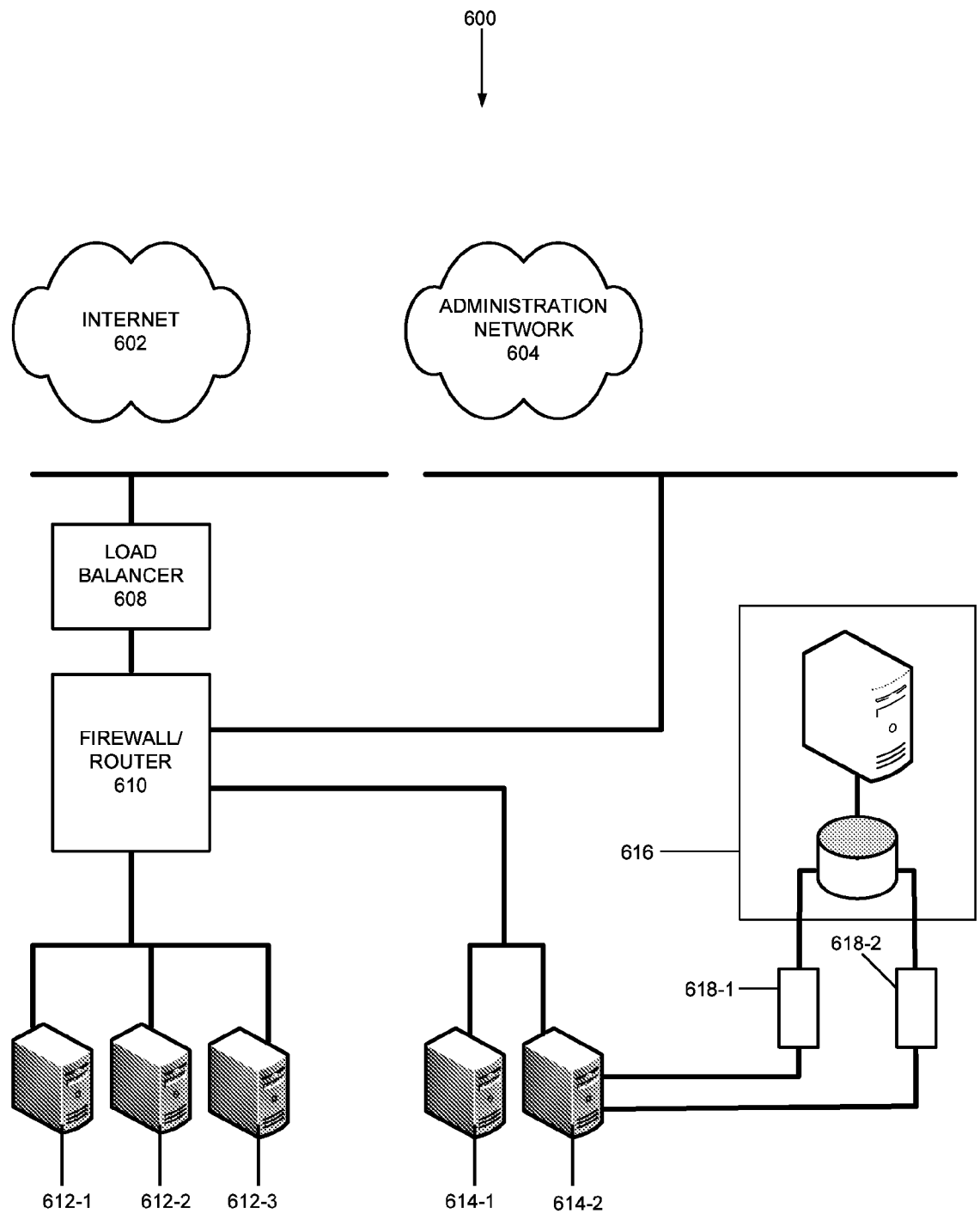
FIG. 6 is a diagram of exemplary resources that the system of FIG. 1 may provision.

FIG. 6 is a diagram of exemplary resources that network 100 of FIG. 1 may provision. As shown in FIG. 6, a user may be provisioned with connectivity to the Internet 602, administration network 604, load balancer 608, firewall/router 610, virtual machines 612-1 through 612-3, physical server devices 614-1 and 614-2, storage device 616, and fiber channels 618-1 and 618-2.

Administration network 604 may provide services such as a backup service, security service, billing, etc. Load balancer 608 may balance network traffic over different devices (e.g., load balance between virtual machines 612-1 through 612-3 and physical server devices 614-1 and 614-2). Firewall/router 610 may safeguard virtual server devices 612-1 through 612-3 and physical server devices 614-1 and 614-2 from outside networks via enforcement of firewall security rules and/or network address translation (NAT). Virtual machines 612-1 through 612-3 may host applications in virtual environments. Physical server devices 614-1 and 614 may host applications in physical devices. Each of physical server devices 614 may access storage device 616 via one of two channels 618-1 and 618-2, which are provided for redundancy in case of a fiber channel failure, for example.

A user at user device 130 may request network 100 to provision the user with one or more instances of network 600, each containing one or more components 608-618 and access to networks 602 and 604 via user portal device 102-2. For example, via a web interface, a user at user device 130 may request a number of virtual machines and/or physical server devices. More specifically, for example, the user may create multiple copies of a reference virtual machines and/or obtain physical devices that are configured similarly as a reference device.

Figure 7:
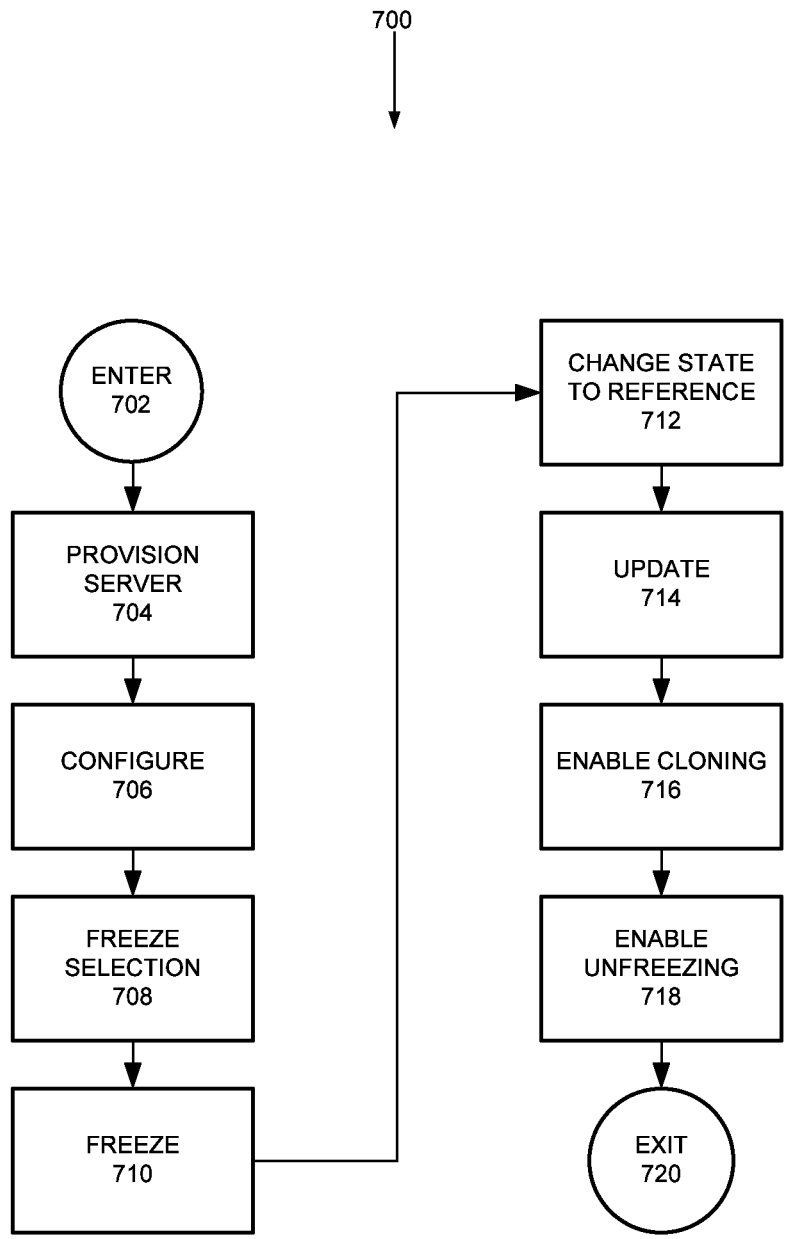
FIG. 7 is a flow diagram of an exemplary process that is associated with creating a reference server.

FIG. 7 is a flow diagram of an exemplary process 700 for creating a virtual or physical reference server. One or more devices in networks 102-112 may enter process 700 when a user invokes provisioning services from networks 102-112 via a client application on user device 130 (block 702). As shown, process 700 may include provisioning a physical/virtual server (block 704). This may include receiving server parameters (e.g., hostname, root password, etc.) from a user, installing an operating system, provisioning storage devices, installing applications on the virtual/physical servers, etc.

Workflow engine device 106-1 may configure the provisioned virtual/physical server based on the received parameters (block 706). The configuration may include setting kernel parameters and rebuilding the kernel (e.g., changing semaphore count, setting a limit on memory usage per process, etc.), parameters for installed applications, network parameters (e.g., security settings), etc.

Resource management device 104-3 may receive from a user/administrator, via portal devices 102-1 or 102-2, the selection of a freeze option for the provisioned server (block 708). Furthermore, in response to the selection, resource management device 104-3 may initiate a process for freezing the provisioned server (block 710). The process for freezing the server is described below in detail with reference to FIG. 8.

At block 712, when the provisioned server becomes frozen, inventory management device 110-3 may indicate that the state of the provisioned server is a REFERENCE state in data warehouse device 110-2 (block 712). Accordingly, portal device 102-1/102-2 may alert administrator/user device 120/130 of the change in state of the provisioned server.

When the browser/client application on the administrator/user device 120/130 receives the alert, the browser/client application on administrator/user device 120/130 may update information presented to the administrator/user (e.g., change a server icon on the browser to reflect the REFERENCE state) (block 714), enable a CLONE option (e.g., a CLONE button or a CLONE menu item) (block 716), enable an UNFREEZE option (e.g., enable an UNFREEZE button on a browser) (block 718), and exit process 700 (block 720).

Figure 8:
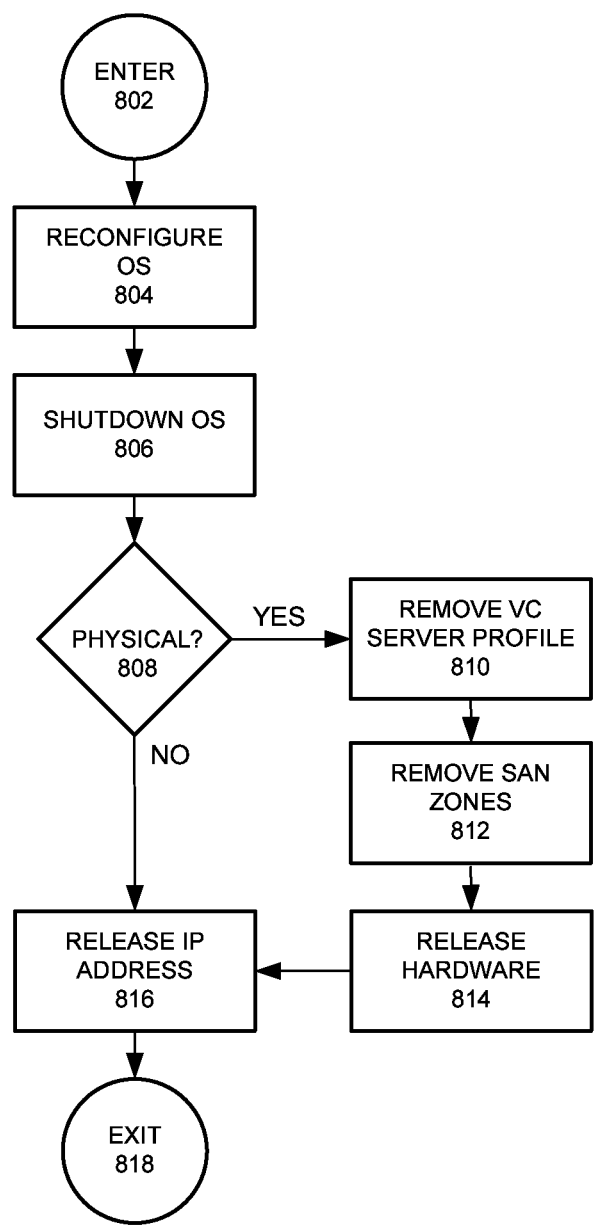
FIG. 8 is a flow diagram of an exemplary process that is associated with freezing a server.

FIG. 8 is a flow diagram of an exemplary process 800 that is associated with freezing a virtual/physical server. Process 800 may correspond to acts that are associated with block 710. One or more devices in networks 102-112 may enter process 800 after a user selects a FREEZE option, for example, at block 708 of process 700 (block 802).

In response, resource management device 104-3 and/or workflow engine device 106-1 may reconfigure the operating system on the provisioned virtual/physical server (e.g., via VMM control device 106-2), such that the virtual/physical server executes or runs a dynamic host configuration protocol (DHCP) client (block 804). This allows an IP address in the pool of IP addresses managed by IP address management device 110-1 to be automatically allocated to or reclaimed from the virtual/physical server.

The DHCP configured virtual/physical server may be shut down (block 806). For example, in accordance with jobs that are placed on the active job queue on job database device 104-1, workflow engine device 106-1 may shutdown the operating system of the virtual/physical server.

At block 808, if the provisioned server is a physical server (block 808—YES), process 800 may proceed to block 810, where workflow engine device 106-1 removes a server profile corresponding to the physical server from the virtual center in which the server resides (block 810). Furthermore, workflow engine device 106-1 may drive a removal of SAN zones (e.g., user defined partitions in storage area network (SAN)) for the physical server (block 812) and release hardware that is associated with the physical server (e.g., server blade). Subsequently, process 800 may proceed to block 816.

If the provisioned server is a virtual server (block 808—NO), the virtual server may release its IP address (block 816), returning the IP address to the pool of IP addresses maintained by IP address management device 110-1. Devices in networks 102-112 may exit process 800 at circle 818.

Figure 9:
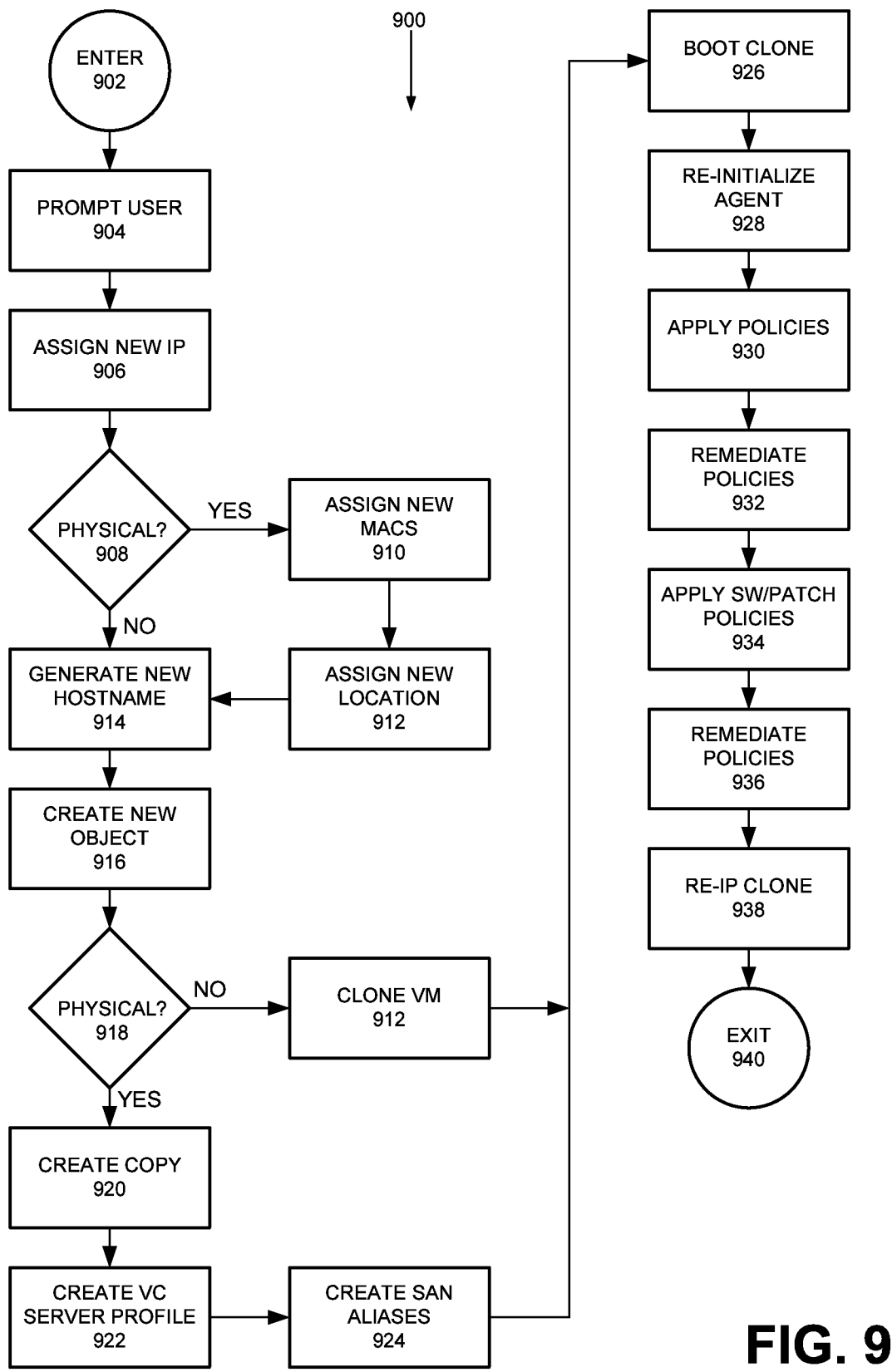
FIG. 9 is a flow diagram of an exemplary process that is associated with cloning a server.

FIG. 9 is a flow diagram of an exemplary process 900 that is associated with cloning a virtual/physical server. Once a reference virtual/physical device has been created (e.g., created via process 700), a user/administrator may request networks 102-112 to clone the reference virtual/physical server. In response, one or more devices in networks 102-112 may enter process 900 (block 902). Assume that a user has requested the reference server created in process 700 to be cloned via portal network 102. As shown, process 900 may begin with a browser or a client application on user device 130 prompting the user to input a new label for the clone (for customer use) and to identify a network (e.g. DMZ, TRUST, etc.) in which the clone may be temporarily placed (block 904).

Workflow engine device 106-1 may assign a new IP address via IP address management device 110-1 (block 906). At block 908, if the clone (e.g., the server that is to be created by copying or cloning the reference server) is to include a physical server (block 908—YES), workflow engine device 106-1 may assign one or more new MACs for network adapters and/or world wide names (WWNs) for fibre channels, etc. in the to-be-clone. In addition, workflow engine device 106-1 may assign a new available location (e.g., a new enclosure, bay, etc.) for the clone (block 910). Then, process 900 may proceed to block 914. If the clone is not to include a physical server (block 908—NO), process 900 may proceed to block 914.

At block 914, workflow engine device 106-1 may generate a new hostname, either automatically or with input from the user at user device 130 (block 914). In addition, workflow engine device 106-1 may generate, at and/or via inventory management device 110-3, a new object that corresponds to the clone (block 916). Inventory management device 110-3 may use the new object to track the state of the clone.

At block 918, if the clone is not a physical device (block 918—NO), workflow engine device 106-1 may duplicate/clone the reference virtual server, except that the clone may be configured with the parameters obtained at blocks 904-910. Process 900 may proceed to block 926.

If the to-be-provisioned clone is a physical server (block 918—YES), workflow engine device 106-1 may create, in the clone, a full copy of boot volumes in the reference physical server (block 920) and create a virtual center profile corresponding to the clone (block 922). In addition, workflow engine device 106-1 may create, for the clone, a SAN alias (e.g., the server name) and a SAN zone that includes the alias (block 924). Process 900 may proceed to block 926.

Workflow engine device 106-1 may boot the clone (block 926), in the network selected at block 906 (e.g., a build network), with an IP address assigned at block 906 via the DHCP service. In addition, workflow engine device 106-1 may reinitialize server agent (e.g., a monitoring/automation agent, such as Opsware™ Server Automation (SA) agent) (block 928). When the server agent is reinitialized, the server agent may register with and connect to another component, such as Opsware SA core on another device (e.g., workflow engine device 106-1), resulting in the creation of a record within the core. The agent may enable one or more devices in networks 102-112 to monitor operating conditions of the clone, install applications, apply and/or remediate policies, etc.

Workflow engine device 106-1 may apply application configuration policies to the clone (block 930), for example, via the server agent/core, a script, program, etc. In one implementation, the server agent may use the policies to generate configuration files (e.g., /etc/hosts, /etc/fstab, etc.), to be used with each application installation. In addition, workflow engine device 106-1 may drive, e.g., via the server agents/core components, the clone to localize/re-localize its operating system (e.g., synchronize the clock on the clone to the local time).

Workflow engine device 106-1 may drive remediation of the policies on the clone, for example, via the server agent/core components (block 932). The remediation may include ensuring that the clone complies with the policies (e.g., pushing the configuration files to the clone).

Workflow engine device 106-1 may apply software policies and patch policies to the clone, for example, via the server agent/core components (block 934). Accordingly, the clone may perform policy remediation (block 936). For example, assume that a software policy dictates installation of a particular version of an application. A remediation may include, for example, updating the application, sending a message to a system operator, removing an outdated version of the application, etc. In another example, the remediation may include installation of a particular set of patches to secure the clone against network attacks.

Workflow engine device 106-1 may drive the clone to obtain a new IP address of the user network, which is in networks 102-112 (block 938). At circle 940, devices of networks 102-112 may exit process 900.

Figure 10:
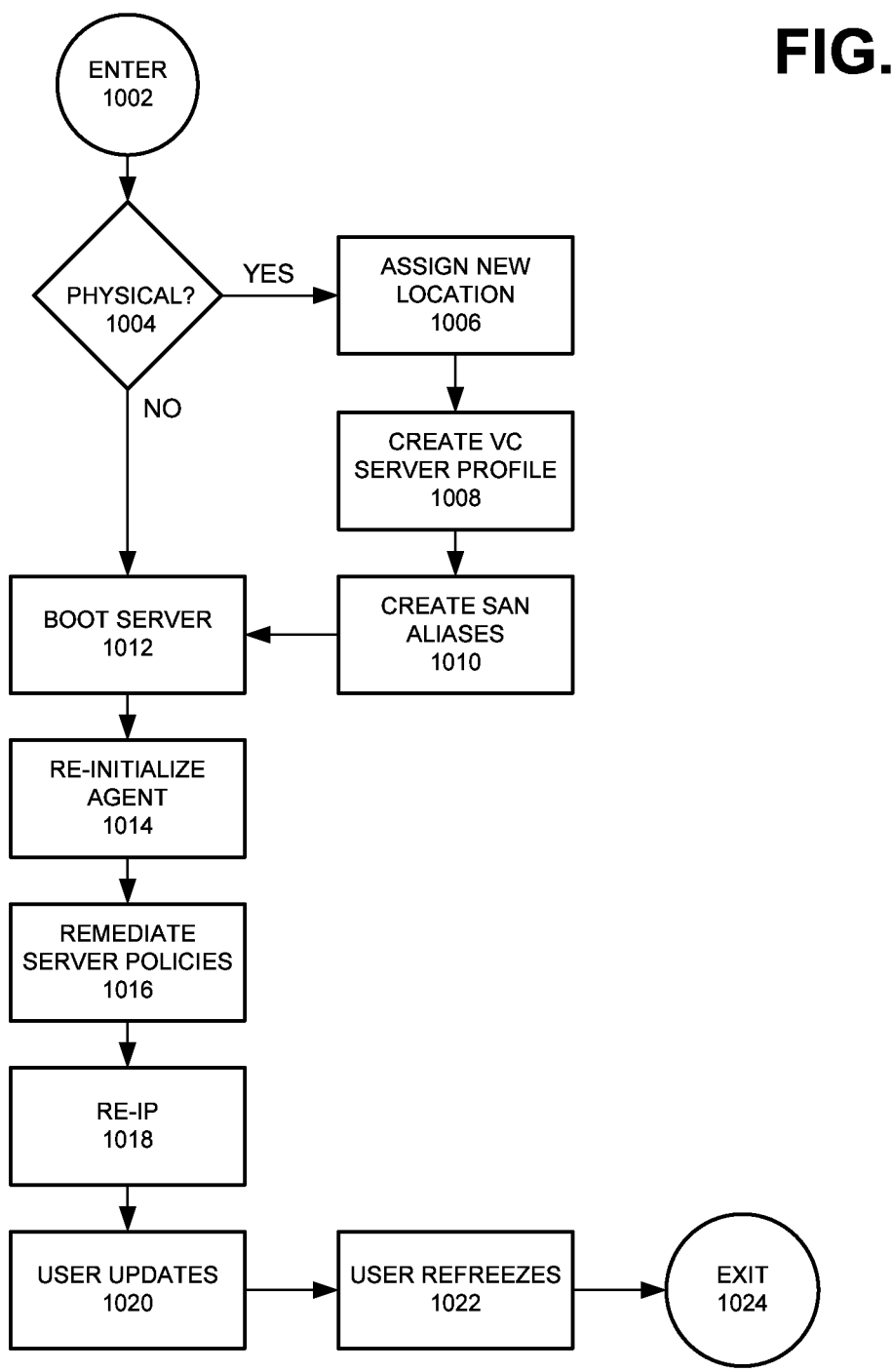
FIG. 10 is a flow diagram of an exemplary process that is associated with updating a reference server.

FIG. 10 is a flow diagram of an exemplary process 1000 that is associated with updating a reference server. As shown, devices in networks 102-112 may enter process 1000 (circle 1002). If the reference server is a physical server (block 1004—YES), process 1000 may assign a new available location (e.g., a new enclosure, bay, etc.) to the reference server (block 1006). In addition, workflow engine device 106-1 may create a virtual center profile corresponding to the reference server (block 1008) and create SAN aliases and zones (block 1010). Process 1000 may then proceed to block 1012.

In the above, blocks 1006-1010 may be analogous to blocks 912, 922, and 924. However, blocks 1006-1010 pertain to the reference server rather than to a clone. Returning to block 1004, if the reference server is not a physical server (block 1004—NO), process 1000 may proceed to block 1012.

Workflow engine device 106-1 may boot the reference server (block 1012), and reinitialize its server agent (block 1014). Reinitializing the server agent may include, for example, restarting the server agent, registering the agent with a core component, etc.

Workflow engine device 106-1 may remediate server policies (block 1016). The remediation may include performing acts that are analogous to those described above with reference to blocks 932 and 936 in process 900. However, the remediation in block 1016 is performed at the reference server rather than at a clone.

Once the policies on the reference server have been remediated, workflow engine device 105-1 may drive assignment an IP address in the user network to the reference server (block 1028). The user network may be included in networks 102-112. Thereafter, the user or another entity (e.g., hardware device, software component, another user, administrator, etc.) may make modifications to the reference server (e.g., update the reference server) (block 1020). After the update, the user may refreeze the reference server (block 1022). At circle 1024, the devices in networks 102-112 may exit process 1000.

The above specification describes how a system may provision both virtual resources and physical resources. When a user wishes to obtain computing resources (e.g., a network, a server, an application, a web server, etc.), the user may connect to an integrated provisioning system via a web portal. Once connected via a web interface, the user may input parameters that describe the desired resources. Based on the parameters, the integrated resource provisioning system may provision and allocate virtual and/or physical resources without manual intervention from a system administrator or an operator.

In some instances, a user or an administrator may wish to obtain computing resources that include more than one identical or similar virtual/physical server. For these instances, the system allows the user to clone virtual/physical servers. By cloning multiple physical/virtual servers, the user/administrator may avoid having to individually manually create and configure each of the virtual/physical servers, a time consuming process.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

Further, while series of acts have been described with respect to FIGS. 7-10, the order of the acts may be varied in other implementations. Moreover, non-dependent acts may be implemented in parallel. Furthermore, in other implementations, processes 700-1000 may include additional, fewer, or different acts than the ones illustrated in and discussed with references to FIGS. 7-10.

It will also be apparent that various features described above may be implemented in many different forms of software, firmware, and hardware in the implementations illustrated in the figures. The actual software code or specialized control hardware used to implement the various features is not limiting. Thus, the operation and behavior of the features of the invention were described without reference to the specific software code—it being understood that one would be able to design software and control hardware to implement the various features based on the description herein.

Further, certain features described above may be implemented as "logic" that performs one or more functions. This logic may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
    provisioning a server for a user based on a user request;
    converting the server into a reference server by freezing the server;
    creating a clone of the reference server in a selected network;
    placing the clone in a user network; and
    notifying the user that the clone server is ready for use.

2. The method of claim 1, wherein the freezing the server includes:
    reconfiguring an operating system of the server as a dynamic host configuration protocol (DHCP) client.

3. The method of claim 2, wherein the freezing the server includes at least one of:
    shutting down the operating system;
    releasing an Internet Protocol (IP) address of the server;
    releasing a hardware component associated with the server; or
    removing a server profile from a local network to which the server belongs.

4. The method of claim 2, wherein the converting the server into the reference server includes converting a virtual server into a virtual reference server,
    wherein the virtual server includes the server; and
    wherein the creating the clone includes at least one of:
    assigning a new Internet Protocol (IP) address to a second server;
    generating a new hostname of the second server; or
    assigning a new media access controller to the second server.

5. The method of claim 1, wherein the converting the server into the reference server includes:
    converting a virtual server into a virtual reference server, wherein the virtual server includes the server.

6. The method of claim 1, wherein the creating the clone includes at least one of:
    assigning a new Internet Protocol (IP) address to a second server;
    generating a new hostname of the second server; or
    assigning a new media access controller to the second server.

7. The method of claim 1, wherein the creating the clone includes:
    creating an object in a network that includes the clone and the reference server, the object tracking state of the clone.

8. The method of claim 7, wherein the creating the clone includes one of:
    copying a boot volume of the reference server to a boot volume of the clone;
    creating a storage attached network (SAN) alias and a SAN zone; or
    applying a software policy and a patch policy to the clone via a server automation program and remediating the software policy and the patch policy.

9. The method of claim 1, wherein the creating the clone includes:
    copying a boot volume of the reference server to a boot volume of the clone.

10. The method of claim 1, wherein the creating the clone includes:
    creating a storage attached network (SAN) alias and a SAN zone.

11. The method of claim 1, wherein the creating the clone includes:
    applying a software policy and a patch policy to the clone via a server automation program; and
    remediating the software policy and the patch policy.

12. The method of claim 1, wherein the placing the clone in the user network includes:
    changing an Internet Protocol (IP) address of the clone to one of IP addresses that are associated with the user network.

13. The method of claim 1, wherein the creating the clone includes:
    assigning a new enclosure to the clone.

14. The method of claim 1, further comprising:
    receiving a user selection of a freeze action from a user device over a network.

15. A system comprising:
    a portal device to receive input from a user device; and
    a workflow device to:
        provision a first server upon receiving a request from the user device via the portal device;
        change a state of the first server to a reference state in response to receiving a second user request from the user by freezing the first server;
        produce a clone of the first server in the reference state, the clone being in a build network; and
        place the clone in a user network.

16. The system of claim 15, wherein the first server includes one of:
    a virtual server; or
    a physical server.

17. The system of claim 15, wherein the workflow device is further configured to:
    drive application of a patch policy; and
    drive remediation of the patch policy.

18. The system of claim 17, wherein when the workflow device drives the remediation of the patch policy, the workflow device is further configured to:
apply a software patch in accordance with the patch policy.

19. The system of claim 17, further comprising:
an enclosure, wherein the workflow device is further configured to:
assign the enclosure to the clone.

20. One or more non-transitory computer-readable media comprising computer executable instructions for causing one or more processors to:
provision a server in response to receiving a first user request;
convert the provisioned server into a reference server in response to receiving a second user request by freezing the provisioned server;
create a clone of the reference server in a build network in response to receiving a third user request;
place the clone in a user network by changing an Internet Protocol (IP) address of the clone to one of IP addresses that are associated with the user network; and
unfreeze the reference server.

\* \* \* \* \*